Oct. 7, 1969   C. D. HENDRIXSON ET AL   3,471,241
OPTICAL ALIGNING DEVICE FOR PARTS OF A MACHINE
Filed Sept. 16, 1965   2 Sheets-Sheet 1

INVENTORS
CHARLES D. HENDRIXSON
ROBERT L. HENRY
BY Pearce & Schaeperklaus
Attorneys

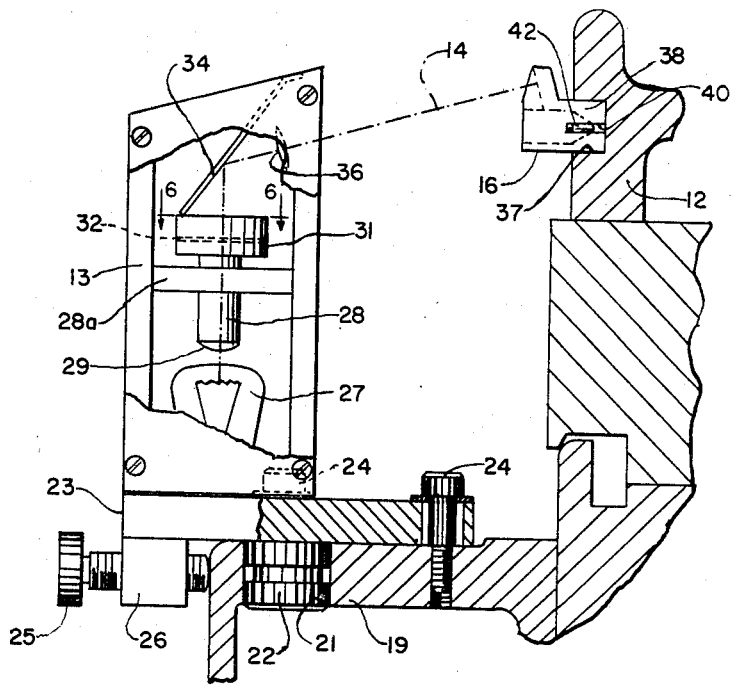
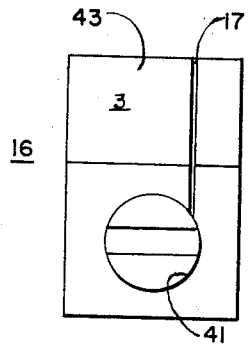
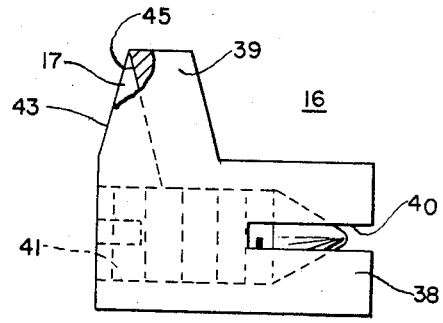
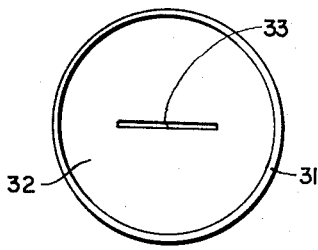

3,471,241
OPTICAL ALIGNING DEVICE FOR PARTS OF A MACHINE
Charles D. Hendrixson, Union Township, Clermont County, and Robert L. Henry, Indian Hill, Ohio, assignors to The Cincinnati Milling Machine Company, Cincinnati, Ohio, a corporation of Ohio
Filed Sept. 16, 1965, Ser. No. 487,819
Int. Cl. G01b 11/26
U.S. Cl. 356—172                                    8 Claims

ABSTRACT OF THE DISCLOSURE

An optical positioning device for indicating alignment between two sections of a machine which includes a member on one section of the machine having a slot extending transversely of the direction of relative movement of the sections and means on the other section for projecting a beam of light toward said member of a dimension in the direction of movement substantially equal to the dimension of the slot in like direction, the light beam disappearing in the slot when the sections are aligned.

---

This invention relates to a device for aligning parts of a machine. More particularly, this invention relates to an optical aligning device.

In the operation of many machine tools and the like, it is necessary to bring a movable section of the tool, which may be either rotatable or translatable, into alignment with another section of the tool not only quickly, but also with accuracy. An object of this invention is to provide an optical device by means of which a clear and exact indication is given when the sections of the machine tool are in alignment.

A further object of this invention is to provide such a device which gives a quick and immediately visible indication when alignment is reached.

A further object of this invention is to provide a device of this type in which a light beam is projected from a housing mounted on one section and in which the location of alignment is indicated when the light beam impinges on a slot in the other section, which slot is of approximately the same width as the light beam so that the light beam substantially disappears when alignment is reached.

A further object of this invention is to provide such a device in which the surface on which the light beam impinges on either side of the slot is finished so as to be light-reflective, as by light random grinding or, as presently appears preferable, by abrading in a direction transverse to the length of the slot so that the light beam is clearly apparent on the finished surface until it reaches the slot, whereupon the light beam substantially disappears.

A further object of this invention is to provide such a device in which the light beam is of a slightly greater width than the slot so that the light beam almost disappears when directed into the slot and in which bands of red and blue light appear at edges of the slot when the alignment is proper.

A further object of this invention is to provide such a device in which the housing and/or the light beam are mounted for movement in the direction of travel of the portion of the device in which the slot is located in order to precisely adjust or index the position of the light beam.

The above and other features and objects of the invention will be apparent to those skilled in the art to which this invention pertains from the following detailed description and the drawings, in which:

FIG. 3 is a view partly in side elevation and partly broken away and in section showing the aligning device and a fragmentary portion of the machine tool illustrated in FIG. 1;

FIG. 4 is a view in front elevation on an enlarged scale showing a dog which is a portion of the aligning device;

FIG. 5 is a view partly in side elevation and partly in section of the dog illustrated in FIG. 4; and FIG. 6 is a top plan view on an enlarged scale taken in the direction of the arrows 6—6 in FIG. 3.

In the following detailed description and the drawings, like reference characters indicate like parts.

Figure 1:
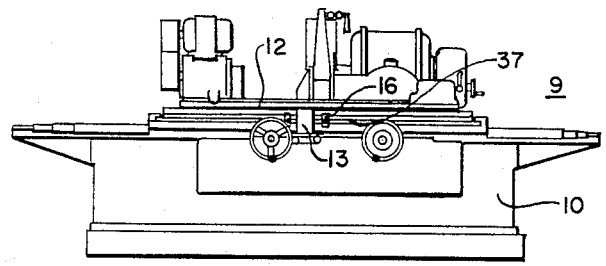
FIG. 1 is a somewhat schematic view in front elevation of a center type grinding machine which includes an aligning device constructed in accordance with an embodiment of this invention.
Figure 2:
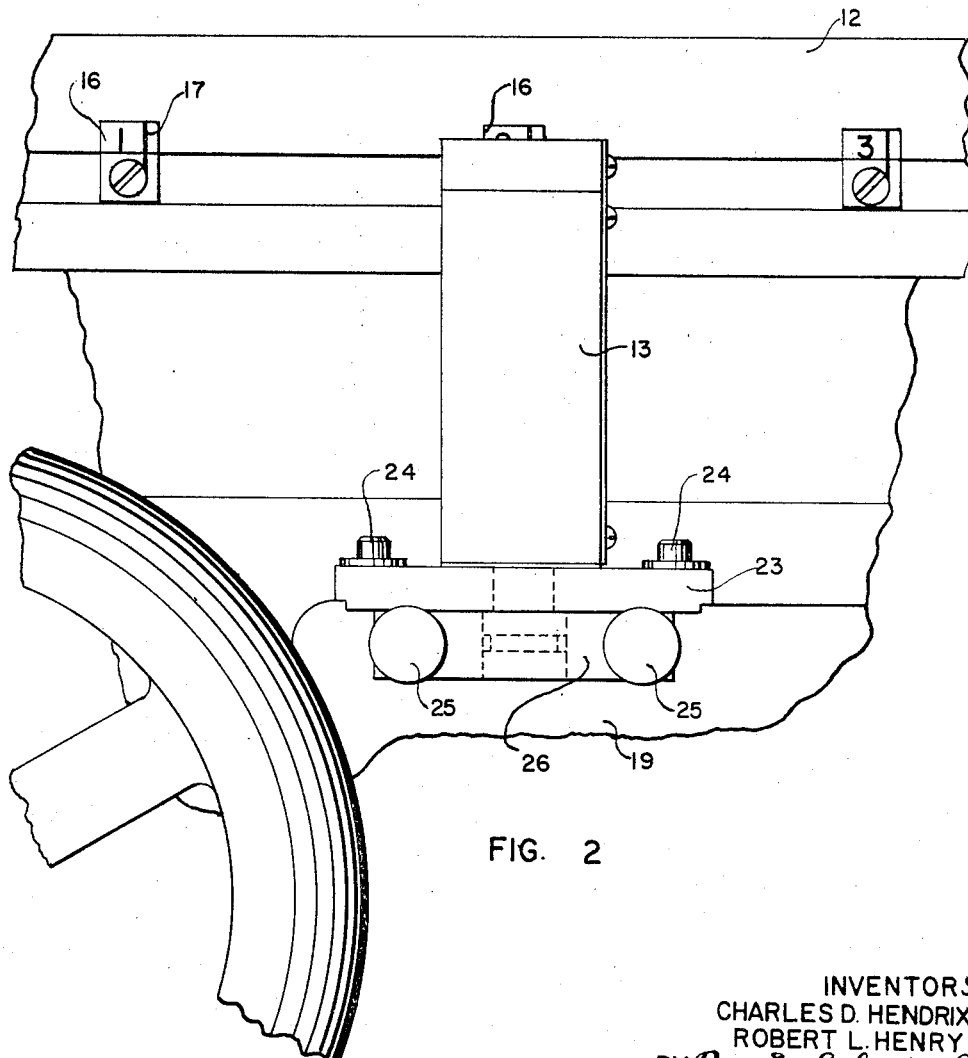
FIG. 2 is an enlarged fragmentary view in front elevation of the machine tool showing the aligning device in greater detail.

In FIG. 1 is shown a center-type grinding machine 9 which includes a stationary base 10 on which a table 12 is mounted for movement to the right and left as shown in FIG. 1 along the base 10. An optical housing 13 is mounted on the base 10 and projects a beam of light 14 (indicated by a dot-dash line in FIG. 3) toward dogs 16 mounted on the table 12. As the table 12 is moved to the left or right as shown in FIG. 2, slots 17 in the dogs can be brought into alignment with the light beam. The width of the light beam is substantially the same as or slightly greater than the width of each slot so that, when proper alignment is reached with the slot in one of the dogs, the light beam substantially disappears in the slot to indicate the proper alignment of the table.

The device which has been described in general terms to this point will now be described in greater detail.

As shown in FIG. 3, a base housing 19 is provided with an upright bearing bore 21 in which a journal boss 22 of a swivel plate 23 is received. The swivel 23 can be held in position on the base housing 19 by releasable fasteners 24, which can be released to permit limited pivoting or swiveling of the swivel plate 23. Adjustment thumb screws 25, which are threadably mounted in a downwardly extending plate member 26 attached to the swivel plate 23, bear on the base housing 19 and can be turned to accurately swing the swivel plate 23.

The optical housing 13 is mounted on and swings with the swivel plate 23. The housing 13 is hollow and encloses a lamp 27 (FIG. 3). Light from the lamp 27 is directed upwardly though a hollow cylindrical barrel 28, which is supported inside the housing 13 on a cross frame 28a. At the lower end of the barrel 28 is mounted a condensing lens 29. In addition, in an enlarged upper portion 31 of the barrel 28 is mounted an opaque plate 32 having a narrow light-transmitting slot 33 (FIG. 6) therein. Light passing through the slot 33 is directed outwardly of the housing by a front-surface mirror 34 and through a projecting lens 36 to the level of the dogs 16. The lens system is arranged so that a sharply defined narrow beam of light impinges on the dogs. The optical elements inside the housing can be mounted on adjustable mounts, not shown in detail, to permit adjustment thereof, and the lamp can be provided with a mounting so arranged as to permit sufficient adjustment thereof for proper alignment and focusing of the light beam.

Each of the dogs 16 is mounted in a slot 37 in the table 12. As shown in FIG. 5, each dog 16 is a unitary element having a rearwardly extending projection 38, which is received in the slot 37, as shown in FIG. 3, and an upwardly extending index portion 39. The projection 38 is slotted as shown at 40 in FIG. 5, and a transverse threaded bore 41 therein receives a screw 42 which spreads the projection 38 sufficiently to cause it to grip edges of the slot 37 to hold the dog in a selected position in the slot. The upwardly extending index portion 39 is provided with a light-receiving face 43 which can be lightly ground or otherwise formed to provide a satin-finished reflective surface on which the image of the light beam is readily observable from locations within a wide angle of view. In this face is provided the upright narrow slot 17, which is of substantially the same width as the light beam or only slightly narrower so that the light beam is trapped in the slot 17 and seems to disappear when the table is brought into proper alignment. For best results the face 43 should be ground in the direction of travel of the dog, i.e., in a direction transverse to the length of the slot 17. As shown in FIG. 5, a back wall 45 of the slot 17 is inclined so that it does not reflect light in the direction that the face 43 reflects the light. As shown, the slot is many times as deep as it is wide and the walls thereof are substantially parallel to the direction of projection of the light beam so that light is trapped in the slot. In addition, if desired, the interior of the slot 17 can be blackened to reduce the light reflected thereby.

Although the width of the slot 17 and of the light beam can be varied, in the embodiment of the invention herein being described, the width of the slot 17 and the width of the light beam are both approximately 0.018 inch, measured in the plane of the parallel edges of slot 17. The width of the light beam should be at least as great as the width of the slot so that there is no portion of the table traverse where no reading can be obtained. Preferably, the width of the light beam is very nearly the same as that of the slot or only slightly greater. When, as the light beam disappears into the slot, bands of red and blue light appear at the deges of the slot, the width of the light beam is in the preferred relation with respect to the width of the slot and the red and blue fringes provide an indication that precise alignment has been reached.

When an operation is to be performed, one or more dogs 16 can be mounted in the slot 37 and the dogs are properly spaced therein. If there is a need for indexing when a work-piece is mounted on the table, the housing can be swung sufficiently to permit proper indexing.

The optical positioning device makes possible rapid advance of the table to aligned position and, when aligned position is reached, provides a sharp accurate visible indication of the proper aligned position.

Instead of swiveling the housing and light beam for purposes of adjustment as hereinbefore described, the housing and/or the light beam may be mounted for translation in the direction of travel of the dogs. This arrangement has the advantage that the light beam always remains perpendicular to the front face of the dogs. Another possibility would be to provide for precision adjustment of the individual dogs, or of all the dogs as a group, by a micrometer screw arrangement.

The invention has been described particularly with relation to a grinding machine, but it will be apparent that it can be used equally well with other machines in which two sections require accurate alignment.

The optical aligning device illustrated in the drawings and described above is subject to structural modification without departing from the spirit and scope of the appended claims.

What is claimed is:

1. An optical positioning device for indicating alignment between two sections of a machine which comprises a member on one section of the machine having a slot extending transversely of the direction of relative movement of the sections and means on the other section for projecting toward said member a beam of light of a dimension in the direction of relative movement of said sections substantially equal to the dimension of the slot in like direction, the light beam being substantially completely received in said slot when the sections are aligned, there being a light-reflective face on said member upon which the area of light beam impingement is visible and between portions of which the slot is located, the slot being substantially non-reflecting whereby light is reflected as the sections approach alignment, and the light substantially disappears when alignment is reached.

2. An optical positioning device for indicating alignment between two sections of a machine which comprises a member on one section of the machine having a light-trapping slot extending transversely of the direction of relative movement of the sections and means on the other section for projecting toward said member a beam of light of a dimension in the direction of relative movement of said sections substantially equal to the dimension of the slot in like direction, the light beam being substantially completely received in said slot when the sections are aligned, there being a flat light-reflective face on said member upon which the area of light beam impingement is visible and between portions of which the slot is located, walls of the slot extending substantially parallel to the direction of the projected light beam, a base of the slot extending in a direction angled to said flat face whereby light is reflected as the sections approach alignment and the light substantially disappears when alignment is reached.

3. An optical positioning device for indicating alignment between two sections of a machine which comprises a member on one section of the machine having a slot extending transversely of the direction of relative movement of the sections, means on the other section for projecting toward said member a beam of light of a dimension in the direction of relative movement of said sections substantially equal to the dimension of the slot in like direction, the light beam being substantially completely received in said slot when the sections are aligned, there being a light-reflective face on said member upon which the area of light beam impingement is visible and between portions of which the slot is located, the slot being non-reflecting whereby light is reflected as the sections approach alignment and the light substantially disappears when alignment is reached, and means for adjusting the light beam relative to said member along the course of relative movement of the sections to index the aligned position.

4. An optical positioning device for a machine tool having a stationary base and a movable element on said base for indicating alignment therebetween which comprises a member on the element having an upright light-trapping slot of substantially greater depth than width dimension in the direction of movement of said element, the slot having parallel walls and means on the base for projecting a beam of light toward the slot of a dimension in the direction of movement of said element substantially equal to the said width dimension of the slot, the light beam being projected parallel to the walls of the slot and being substantially completely received in said slot when the element and the base are aligned, there being a light-reflective face on the member upon which the area of light beam impingement is visible and between portions of which the slot is located, whereby light is reflected as alignment is approached and the light substantially disappears when alignment is reached.

5. An optical positioning device for a machine tool having a stationary base and a movable element on said base for indicating alignment therebetween which comprises a member on the element having an upright light-trapping slot and means on the base for projecting toward the slot and transversely of the direction of movement of said element a beam of light of a dimension in the direction of movement of said element substantially equal to the dimension of the slot in like direction, the light beam being substantially completely received in said slot when the element and the base are aligned, there being a light-reflective face on said member upon which the area of light beam impingement is visible and between portions of which the slot is located, whereby light is reflected as alignment is approached and the light substantially disappears when alignment is reached.

6. An optical positioning device for a machine tool having a first element and a second element movable relative to said first element for indicating alignment therebetween which comprises a member on the second element having an upright light-trapping slot of substantially greater depth than width dimension in the direction of movement of said second element, there being a light-reflective face on the member upon which the area of light beam impingement is visible and between portions of which the slot is located, the slot having parallel edges and means on the first element for projecting a beam of light toward the slot of a dimension in the direction of movement of said second element substantially equal to the distance between the edges of the slot, the light beam being projected toward said reflective face and the slot and being substantially completely received in said slot when the second element and the first element are aligned, whereby light is reflected as alignment is approached and the light substantially disappears when alignment is reached.

7. For a machine tool having a first element and a second element movable relative to said first element, an optical positioning device for indicating alignment between said elements, which device comprises a member on the second element having a light-trapping slot extending transversely of the direction of movement of said second element and means on the first element for projecting toward the slot a beam of light of a dimension in the direction of movement of the second element substantially equal to the dimension of the slot in the direction of movement of the second element, there being on the member a light-reflective face upon which the area of light beam impingement is visible and between portions of which face the slot is located, the light beam in the plane of the face being substantially completely received in said slot when the second element and the first element are aligned, whereby light from said beam impinges on and is reflected from said light-reflective face as alignment is approached and such impingement and reflection substantially ceases when alignment is reached.

8. An optical positioning device for indicating alignment between two sections of a machine which comprises a member on one section of the machine having a slot extending transversely of the direction of relative movement of the sections, there being a light reflective face on said member upon which an area of light beam impingement is visible and between portions of which the slot is located, the slot being substantially non-reflecting, and means on the other section for projecting toward said member a beam of light having a central portion of a dimension in the direction of relative movement of said sections substantially equal to the dimension of the slot in like direction and a red fringe portion adjacent the end of the beam in one direction of movement and a blue fringe portion adjacent the opposite end of the beam, the central light beam portion being substantially completely received in said slot while the red fringe portion impinges on said light reflective face adjacent to one side of the slot and the blue fringe portion impinges on said light reflective face adjacent the opposite side of the slot when the sections are aligned, whereby light is reflected as the sections approach alignment, and the central light portion substantially disappears when alignment is reached.

References Cited

UNITED STATES PATENTS 1,602,698 10/1926 Nielsen _____ 33—46.2
2,692,527 10/1954 Wetzel et al.
3,012,469 12/1961 Clayborne.

FOREIGN PATENTS 1,367,791 6/1964 France.

RONALD L. WIBERT, Primary Examiner

J. ROTHENBERG, Assistant Examiner

U.S. Cl. X.R.

350—271